No. 665,247. Patented Jan. 1, 1901.
E. A. MARSH.
FLUSH VALVE.
(Application filed Mar. 10, 1899.)
(No Model.)
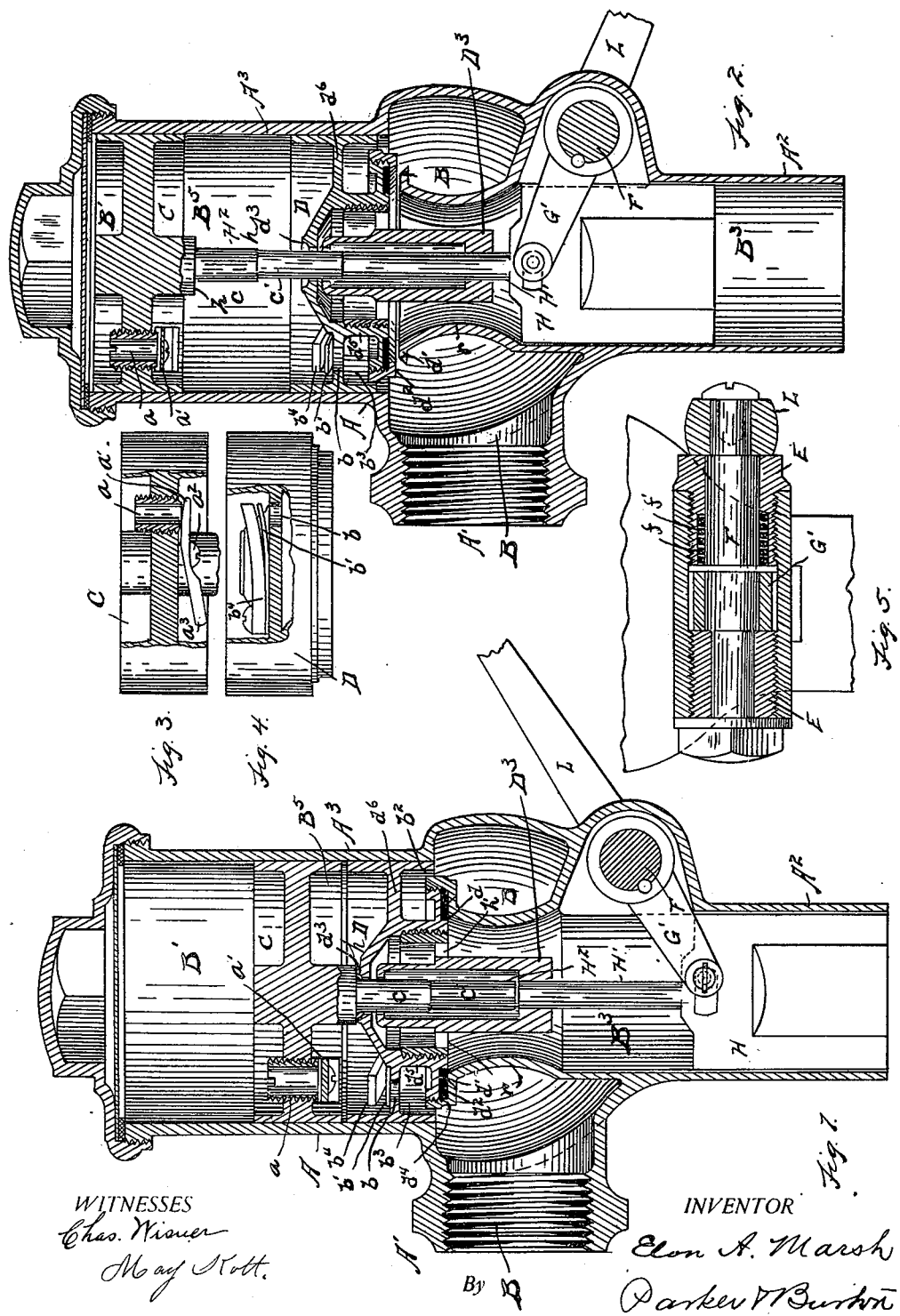
WITNESSES
Chas. Wisner
May Kott.
INVENTOR
Elon A. Marsh
Parker W Burton
By
Attorneys.

UNITED STATES PATENT OFFICE.

ELON A. MARSH, OF BATTLE CREEK, MICHIGAN.

FLUSH-VALVE.

SPECIFICATION forming part of Letters Patent No. 665,247, dated January 1, 1901.

Application filed March 10, 1899. Serial No. 708,493. (No model.)

*To all whom it may concern:*

Be it known that I, ELON A. MARSH, a citizen of the United States, residing at Battle Creek, county of Calhoun, State of Michigan, have invented a certain new and useful Improvement in Flush-Valves; and I declare the following to be a full, clear, and exact description of the invention, such as will enable others skilled in the art to which it pertains to make and use the same, reference being had to the accompanying drawings, which form a part of this specification.

This invention relates to flushing apparatus, and has for its object an improvement in that class of valves which not only admit the passage of liquid by them, but are self-closing after the passage of a definite predetermined quantity. In the improved valve in which this invention is embodied the water used is taken or can be taken directly from the main of the water system, and the valve having once been opened to allow water to begin to pass through it will remain open until such a quantity of water has passed through as may be desired and which accords with the adjustment and the size of the valve, and this result will be accomplished irrespective of the pressure that exists in the water-main side of the valve. Valves intended to produce these results, whether they be entirely automatic or not or whether the mechanism for actuating them be contained entirely in the valve and its immediate adjuncts or be contained in some near-at-hand mechanism, are called "flushometers."

In the operation of those flushometers which have been heretofore made and which to the best of my information constitute the state of the art it is important and essential in all of them to regulate the flow of water through the flushometer by a gate-valve or some equivalent device. The necessity of this arises from the variable flow of water at different pressures, since by a well-known law of hydraulics the velocity of flow through a pipe or discharge through an orifice varies as the square root of the pressure. Thus if it is desired to flush a closet with water at a pressure or head of two pounds to the square inch the orificial capacity of the flushometer must be ten times as large as would be required if the head of pressure was two hundred pounds to the square inch. On account of this unalterable law of the flow of fluids under pressure it has heretofore been necessary to adjust the orificial capacity of a flushometer for a specific pressure, so as to discharge the required amount of water to properly flush a closet in a given time. Again, if the service pressure is increased the orificial capacity must be reduced, or if the service pressure diminishes the orificial capacity must be increased; otherwise the amount of water discharged in a given time would be disastrously large and wasteful or entirely insufficient to properly flush a closet. It therefore follows that these so-called "flushometers" are not flushometers at all, neither are they measuring-faucets or volumeters, but merely and simply automatic-closing valves.

In many cities employing the direct-pressure system of waterworks the service pressure varies greatly, and in those cities where the service pressure is nearly constant at any level it varies greatly on the various floors of a high building. In order to adapt the usual type of flushometer to work at all satisfactorily at any one of these varied pressures means are provided within the device whereby the orificial capacity may be adjusted for a specific pressure. However, when the device is constructed to work nicely at any one pressure it cannot be adjusted to work so nicely at any other pressure. Unfortunately, too, these devices usually fall into the hands of householders and others unfamiliar with hydraulic mechanism and formula. When a valve in a line of pipe is opened to allow water under pressure to flow out freely, a long column of water is set in motion and cannot be stopped instantly without producing excessive pressure, resulting in a shock or tension injurious to the system of piping in a building and causing a disagreeable and reverberating noise, known to mechanics as "water-hammer." In self-closing valves as heretofore constructed the velocity of closure of the supply-valve increases with increasing pressure, and in cases where the service pressure is ordinarily high it has been necessary to attach an air-chamber to the flushometer in such manner that a confined column of air acts as a dynamic cushion. However important air-chambers may be in such cases objections to their use lie in the fact that they are an additional expense, are receptacles for foul air, occupy valuable space, and mar the harmony of an artistic ensemble. The manner in which I overcome these defects and flush a closet with a nearly uniform quantity of water regardless of the head or pressure of water employed, without an air-chamber or equivalent device, and without shock or injury to the service-pipe or its connections, is fully set forth in the specification and shown in the drawings of this specification.

In the drawings, Figure 1 is a sectional view showing the device with the main valve closed. Fig. 2 is a sectional elevation showing the device with the main valve open. Fig. 3 is a vertical section taken through the upper float-piston at right angles to the section-line of Fig. 2 and through the tube $a$. The figure shows in detail the timing-valve. Fig. 4 is a vertical section through the piston-valve, and it shows in detail the pressure-regulating valve. Fig. 5 is a section through the lever-journal.

A indicates the main casing, provided with a threaded supply-inlet passage A' and with a slip-joint outlet connection $A^2$.

D indicates a piston-valve arranged to reciprocate in the cylinder $A^3$, which forms the upper part of the casing. The piston D is provided on its under side with a valve-face $d$ of less diameter than the diameter of the piston, and the valve D engages on the valve-seat $d'$, that terminates the upper or mouth end of the outlet-passage $B^3$. The piston D is also provided with a central perforation $d^3$, through which works the stem $H^2$, that projects downward from another piston C, located above the volumeter-piston and which in distinction therefrom I will call the "float" or "timing" piston. Around the upper mouth of the orifice $d^3$ is a valve-seat arranged to engage and seat a valve-flange $h$, that surrounds the valve-stem $H^2$. The stem $H^2$ extends below the valve-flange $h$ and projects through and for some distance below the orifice $d^3$. At its lower end it is in alinement with and some time in engagement with a plunger H', that works vertically through bearings in a hanging chamber $D^3$, which is secured to the lower side of the volumeter-piston D. The stem $H^2$ is smaller at its lower end than it is at the point where it emerges from the valve-flange $h$, and the reduction in diameter may be made either by making this stem conical in shape or by making a portion of the stem a cylinder of one diameter and another portion or other portions of a different diameter, the object of the change in size being to produce a larger waterway through the opening $d^3$ when the timing-piston is higher up with respect to the volumeter-piston, and the object of the larger waterway will be explained later.

The lower face of the volumeter-piston D is provided with a gasket $d^2$, held under a flange-ring $d^4$, that is screwed to a flange on a hanging cylinder $d^5$, that hangs from the web $d^6$. Across the piston D, between the flange $d^4$ and the walls of the piston D, is an annular water-passage $b^2$, that leads from an annular chamber B into a second annular chamber $b^3$, that surrounds the wall of the hanging cylinder $d^5$ and lies under the web $d^6$ of the piston D. Through the web $d^6$ is a hole or water-passage $b$, above which is placed a curved valve-stop $b^4$, and under the curved valve-stop is a flexible flap-valve $b'$. The combined action of the flexible flap-valve $b'$ and the curved valve-stop behind it is to produce a variation in the resistance to the passage of water flowing through the passage-way $b$. The water bends the valve, but the bending of the valve is resisted by the curved stop behind it, and the further it is bent the shorter the free portion of it becomes, and consequently the more work is required to bend it. Its action in restricting the flow of water will be described more at length hereinafter. Above the volumeter-piston is the float-piston C, and between the two pistons is a water-chamber $B^5$. Through the web of the float-piston C is a water passage-way $a$, the walls of which consist of an externally-threaded tube so arranged that the end of the tube may be adjusted vertically above a flap-valve $a'$. The flap-valve $a'$ closes upward against the lower mouth of the tube $a$ and is actuated in its closing direction by a counterweight $a^3$. The valve swings on a pin $a^2$.

The plunger H' is actuated by an externally-actuated lever L, pivoted on bearings E, that are inserted through the outer walls of the casing into a chamber made for their reception. The external portion of the lever L is mounted on the end of the spindle F, and suitable packing-gaskets $f f'$ are provided to make this packing water-tight. The inner end of the lever G' engages with the lower end of the plunger H', being connected by a pin that works in the cross-slot at the connection between the plunger H' and the guide-block H at its upper end.

The operation of the device is as follows: In Fig. 1 all the parts are shown in the position occupied by them when the flush-valve is closed. When it is desired to flush a closet, the free end of the lever L is pressed downward to the position shown in Fig. 2. The end G' of the lever L swings upward and lifts the block H and the plunger H'. This lifts the float or timing piston C and the depending stem $H^2$, made, as hereinbefore described, with parts $c\ c'$ having different diameters. As the piston C rises any water which was above must be transferred to the chamber below it, and the slight pressure produced by the upward movement of the piston C causes the flap-valve $a$ to open, and the water is allowed to pass freely through the tube $a$ from the chamber B' to the chamber $B^5$. When the timing-piston has come to rest after its upward movement, the valve $a'$ is closed by the action of the counterweighted end $a^3$.

When the lever L is released by the operator, the weight of the guide-block H and the pressure of water on the upper end of the plunger H' cause the inclosed end G' of the lever to fall, and the timing-piston C being no longer supported from without by the lever mechanism will return to its seat on the piston D; but it cannot fall rapidly because it can only fall as fast as the chamber B' fills with water. The lower end of tube $a$ is cut straight across and the tube itself is primarily adjusted to produce such an opening between the tube and the flap-valve $a'$ as is required to cause the drop of the piston C in the desired time. When the piston C is at rest, the pressure of water in the chambers $B^5$ and B' will be the same, and if at this time the piston C be resting on the piston D the pressure of water will be the same as the high pressure in the chamber B and the piston D will be held with the valve-face $d$ in close engagement with the valve-seat $d'$; but when the piston C is lifted there is a passage-way for water from the chamber $B^5$ through the opening $d^3$, and the water passing through this opening escapes into the outlet. The result of this flow, whether it be great or little, is to lower the pressure on the chamber $B^5$, and whenever the pressure in the chamber $B^5$ is lower than it is in the high-pressure chamber B the water will flow from the high-pressure chamber B into the chamber $B^5$ through the small passage $b$. The velocity of flow of water through an orifice depends on the pressure which produces the flow, and if the water passes into the chamber $B^5$ and out of it again at the same velocity it must be because there is the same net pressure producing the flow in both instances. If then the orificial area of the passage $b$ is equal to the orificial area of the passage $d^3$ and the velocity of flow through each orifice is the same, the pressure in the chamber B will exceed the pressure in the chamber $B^5$ to the same amount that the pressure in the chamber $B^5$ exceeds the pressure in the chamber $B^3$. The area of that part of the piston D which is exposed to the pressure of the water in the chamber $B^5$ is greater than the area of that part of the piston D which is exposed to pressure from the water in the chamber B. (In the drawings it is intended to show one of these twice as large as the other.) The piston D, therefore, would be balanced as to pressure under the state of facts just expressed where the areas of the exposed faces have this proportion and the pressure in the chamber B exceeds the pressure in the chamber $B^5$ by the same amount that the pressure in chamber $B^5$ exceeds the pressure in the chamber $B^3$. Under these conditions the piston D would be held with the valve $d$ on its seat by the force of gravity alone. If, however, the passage $b$ is reduced in area, so as to be slightly less than the passage $d^3$, the same quantity of water passing into and out of the chamber $B^5$ will have a slightly greater velocity through the passage $b$, and such increased velocity of flow can happen only when the difference in pressure between the water in the chamber B and the water in the chamber $B^5$ is greater than the difference in pressure between the water in the chamber $B^5$ and the water in the chamber $B^3$. The result of such a change will be that the pressure in the chamber $B^5$ will be slightly reduced if the pressure in the chamber B remains constant, and if this difference be sufficient to overcome the gravity of the piston D this piston will rise from its seat and the water will flow directly from the chamber B to the chamber $B^3$. Between the inlet or orificial openings at the valve-seat $d'$ and the lower part of the chamber $B^3$ not only are the walls drawn in and the passage-way restricted at $r$, but there is also located in the upper part of this passage parts of the mechanism which act to restrict the flow of water, and the contracted walls of the passage at $r$ cause a greater impediment at that point than there is below, so that as the water flows through the orifice and passes below the constricted part $r$ into the outlet-passage there is a reduction of pressure. Now whatever pressure exists in the upper part of the passage $B^3$ impedes to some extent the flow of the water from the chamber $B^5$ and causes a corresponding increase of pressure in the chamber $B^5$ above the piston D, and this tends to counteract the lifting force of the water in the chamber B. However, the pressure in the upper part of the chamber $B^3$ exerts a lifting force, and the exposed area of the lower end of the tube $D^3$ becomes a determinating factor in the amount of lift permissible to the piston D, since any increase of pressure in the upper end of the chamber $B^3$ over that in the lower end of the same chamber is attended by a corresponding increase of force tending to close the piston D on the valve-seat $d$. With a fixed area to the passage $b$ any variation of the passage $d^3$ will affect the pressure in the chamber $B^5$, and consequently affect the lift of the valve, and if the area of the passage $d^3$ is greatest when the timing-piston is at the limit of its upward movement and if this area decreases as the piston C settles to its seat on the piston D the flow of water into the closet will be initially strong, with diminishing volume as the piston settles, thus insuring a proper refill or afterflush and a soft and noiseless closure of the main valve.

In the drawings the stem $c\ c'$ is shown as having two diameters, and this will produce results substantially the same, although, perhaps, not quite as gradual as though the stem was tapered throughout or for part of its length. In fact, by giving to this stem the proper shape almost any desired variation in the action of the valve can be produced.

The function of the piston D is to regulate automatically the flow of water into the closet, and the function of the piston C is to regulate the time of the flow and to further influence the governing element of the piston D, as indicated in describing the action and functions of the stem $H^2$.

Heretofore where a timing-piston has been used it has been subjected to and greatly influenced by the pressure employed in the supply-pipe, from the fact that the stem of the timing-piston was exposed to high pressure in such a way as to act either with or opposed to the force of gravity, and it was therefore necessary to adjust the communicating passage between the chambers on the opposite sides of the piston to make it accord with the specific pressure employed. In my invention I am able to balance the piston C as to pressure, since whatever pressure exists in the chamber $B'$ during each operation also exists in the tube $D^3$, into which the lower end of the stem $H^2$ is received. This is explained in this way: The tube $D^3$ may be compared to a bottle, into the neck of which drops the stem $c\ c'$. When the piston C is lifted and water begins to flow through the passage $d^3$, it fills the tube $D^3$ and continues to pour into the tube $D^3$, keeping it full. As the plunger $H'$ drops, the water pours into this tube, filling it, because until it is full there is less resistance to its flow in this direction than there is to its flow over the upper end of the tube $D^3$ into the passage or chamber $B^3$; but as soon as the tube $D^3$ is full then the escape for water is in the passage $B^3$. As the piston begins to fall it is required to displace the water that has accumulated in the tube $D^3$. This water to escape must rise through the narrow annular passage that surrounds the stem $c$, and it must rise against the force of the stream that is coming down through the annular passage $d^3$. Now the water coming through the passage $d^3$ is still under about the same pressure that it had in the chamber $B^5$. The pressure of course has been somewhat reduced, or there would be no flow; but the water is still in a very much restricted passage, and it is still under a comparatively high pressure, and the water escapes from the tube $D^3$ against the falling water, and it must have about the same pressure, perhaps a little higher pressure, than the falling water, because it is sustaining on the small face that terminates the lower end of the stem $c'$ some considerable portion of the weight of the piston C. As a result of all these factors the water in the tube $D^3$ has a pressure which approximates closely to the pressure of the water in the chamber $B^5$.

The area of the orifice of the passage $a$ during the fall of the piston C is determined by the angle of the metal flap-valve $a'$ at the lower end surface of the tube $a$. If the tube $a$ be screwed down, the angle of the flap-valve increases and the orifice increases, and the piston C may thus be adjusted to fall in any specific time, uninfluenced by variations of pressure employed.

In controlling the flow of water by means of an unbalanced or differential piston, such as the piston D, there are two disturbing elements. The first is the weight of the piston D. This is a disturbing element at low pressure, but is insignificant at high pressure. The second disturbing element is the cross-sectional area of the tube $D^3$—an element which is introduced to affect the equilibrium of the piston D. The action of this second disturbing element may be explained in this way: Suppose there be in the chamber B a pressure of one hundred pounds and that at the upper end of the chamber $B^3$ the pressure is reduced to two pounds and suppose the inflow into the intermediate chamber $B^5$ through the passage $b$ and the outflow from the chamber $B^5$ through the passage $d^3$ are equal. In order that they may be equal, the excess of pressure in the chamber B over the pressure in the chamber $B^5$ must equal the excess of pressure in the chamber $B^5$ over the pressure in the upper end of the chamber $B^3$, and the pressure in the chamber $B^5$ under the conditions supposed will be fifty-one pounds. The pressure in the chamber B exceeds the pressure in the chamber $B^5$ by forty-nine pounds, and the pressure in the chamber $B^5$ exceeds the pressure in the upper end of the chamber $B^3$ by forty-nine pounds; but the hanging element $D^3$ projects into the lower part of the chamber $B^3$, where the pressure is still lower than it is in the upper part of the chamber $B^3$. That the pressure is less at the lower end of the hanging member $D^3$ than it is at the upper end will be readily understood when we consider two facts—first, that the water is flowing from the upper to the lower end, and, second, that immediately below the hanger the capacity of the tube increases to the extent of the cross-section of the hanger, (and, as shown in the drawings, in this case to the further extent that the pipe itself enlarges; but this last feature may not always be employed in the construction of the pipe.) There are then on the under side of the valve three zones of pressure. One zone is subjected to high pressure, a second zone is subjected to low pressure at the upper end of the chamber $B^3$, and the third zone is subjected to lower pressure at the lower end of the hanging member in the chamber $B^3$. On the opposite side of the valve or piston D there is a zone of pressure which comprises all of the diaphragm and extends to the edge of the orifice $d^3$. Now the high pressure in the chamber B and the low pressure in the upper end of the chamber $B^3$ balance the intermediate pressure in the chamber $B^5$, and if the pressure in the upper end of the chamber $B^3$ varies the change of pressure is immediately communicated to the pressure in the intermediate chamber. If the pressure in the upper end of the chamber $B^3$ drops, the pressure in the intermediate chamber $B^5$ diminishes also, and owing to the fact that this diminished pressure is brought about without changing the relative size of the zone on which the pressures act the high pressure now serves to open the orifice to a wider extent and permit a greater outflow and consequent immediate rise to a normal in the upper part of the chamber $B^3$. The area or cross-section of that part of the hanger $D^3$ which is exposed to the lowest pressure becomes an element of importance in this action of the valve. If the hanger were not there, there would be only two zones of pressure on the underside of the valve, and whenever the sums of the pressures on the two zones equal the pressure on the opposite side the valve would be balanced and it would not regulate, but would remain fixed in any position in which it might be placed, subject, of course, to being closed by the timing-piston; but it would not measure the water at all. The flow through it would depend on the high pressure and on the amount of opening of the orifice; but the introduction of the hanging element into the structure brings in action a third zone of pressure and reduces the area of the zone acted upon by the pressure at the top of the chamber $B^3$ and brings about the desired regulation of pressure in the outflow-pipe. In this invention there is a lifting pressure exerted on a zone of the valve which is exposed to the pressure of the high-pressure chamber, and this lifting pressure is variable or may be variable. There is another lifting pressure exerted on a zone which is exposed to the pressure of the first low-pressure chamber, and this lifting force it is desired to have constant. There is another lifting force exerted on a zone or area of the valve which is at the lower end of the hanging stem $D^3$, and this pressure it is desired to have constant. There is a closing pressure on the opposite side of the valve, and this area of pressure is equal to the sums of the areas exposed to lifting pressure; but the pressure on this area varies at the same time that the high pressure varies. The net lifting pressure therefor is a compound of the high pressure, the two low pressures, and the intermediate or depressing pressure, and two elements of the component are constant. The result of the net variable components must, with the weight of the valve, be equal or substantially equal to the constant component, and this proportion is provided for by proportioning the area of the end of the hanging projection in relation to the sizes of the orifices and in connection with particular features of construction, such as the hanging wall $b^5$, and other features of construction which may be varied greatly without departing from the main idea of the invention, which, in so far as it relates to a controlling-valve, introduces the hanger $D^3$ as an element and also introduces the automatically-acting spring $b^4$, which regulates the working capacity of the orifice $b'$. A peculiar feature of the action of the valve is that a variation of pressure from the normal on the low-pressure side instead of acting upon the valve directly acts, so to speak, "inversely"—that is, if the low pressure lowers the valve tends to open, and if the low pressure increases the valve tends to close. Thus if the pressure in the upper end of the chamber $B^3$ drops below the normal the change of pressure is immediately communicated to the pressure in the intermediate chamber, and the pressure in this chamber diminishes also; but the relative size of the zones or surfaces on which these two pressures act is not changed, nor is the size of the zone on which the high pressure acts changed, and the high pressure now serves to open the orifice of the valve, pressing the valve open against the diminished pressure in the intermediate chamber. On the contrary, if the pressure in the chamber $B^3$ rises above the normal the pressure in the intermediate chamber immediately rises in a proportional degree, and the increased pressure in the intermediate chamber now tends to close the valve against the high pressure which had opened it, and this tendency continues until the diminished flow through the contracted orifice has reduced the pressure in the chamber $B^3$ to normal and brought about a corresponding intermediate normal pressure. Both these disturbing elements must be considered in determining the relative areas of the inlet and outlet passages $b\ a$, which lead into and out of the chamber $B^5$ and require that the inlet $b$ be small for low pressure and larger for higher pressure. To meet this requirement of the variation of the relative capacities of these passages, I employ a flexible strip of metal $b'$, behind which is a curved rigid stop $b^4$. The orifice of the passage $b$ is determined by the clearance between the end of the tube and the flexible strip, and as the flexible strip bends upward its point of contact against the fixed strip moves farther forward, and that part of the flexible strip which can be still further bent is thus shortened, so that there is a constantly-increasing resistance as the orifice opens and enlarges. Thus a properly-constructed device when it leaves the factory is adjusted to discharge the proper quantity of water regardless of the pressure in the water-main from which it receives its supply, and no adjustment is necessary after the adjustment of the tube $a$ to properly time the discharge, and this structure both times the discharge and measures the quantity of water passing through, irrespectively of the initial pressure.

What I claim is—

1. In a pressure-regulating valve, having a suitable casing with inlet and outlet passages, an intermediate-pressure chamber separated from the inlet and outlet passages by a piston-actuated valve, said piston exposed on one side to the pressure of the intermediate chamber and exposed to high pressure upon a part of its area, to low pressure upon another part of its area and to still lower pressure upon a third part of its area presented on the end of a projection extending through the low-pressure chamber, a passage leading from the high-pressure chamber to the intermediate-pressure chamber whose orifice varies automatically with the fluid-pressures, and a passage leading from the intermediate-pressure chamber to the low-pressure chamber, whereby any variations of pressure in the low-pressure chamber cause a corresponding variation of pressure in the intermediate-pressure chamber resulting in a movement of the piston-actuated valve to open or close the orifice leading from the high-pressure chamber to the low-pressure chamber, substantially as shown and described.

2. In a volumetric piston-valve, in combination with a casing, and a diaphragm crossing the casing, a chamber on the inlet side of the valve, a chamber on the outlet side extending from the valve-seat below a hanger from the piston, and constituting a space of less capacity than the outlet immediately below the hanger, a differential piston exposed on one side to high pressure over one area, and to low pressure over another area, and on the other side to pressure of fluid contained in a chamber which communicates with both the high-pressure chamber and the low-pressure chamber, a hanger from the piston extending through the low-pressure chamber, and means whereby the communicating passage between the intermediate chamber and the low pressure is gradually reduced in capacity, and the pressure in the intermediate chamber gradually increased, substantially as described.

3. In a flushing device, the combination of a main valve, and a timing-piston, means whereby the pressure on the two sides of the main valve are balanced during the period of flushing, and means actuated by the timing-piston to regulate the pressure tending to close the main valve, substantially as described.

4. In a volumetric flush-valve, in combination with a casing provided with a diaphragm, an inlet, and a high-pressure chamber at one side of said diaphragm, an outlet at the other side of said diaphragm, and a chamber between the inlet and the outlet having a restricted passage between the chamber and the outlet, a piston-valve provided with a projection extending into the outlet-passage and provided with a face against which the low pressure in the outlet reacts against the projection, said valve having areas exposed to high pressure and to low pressure, and to the intermediate pressure in the chamber in which said piston-valve reciprocates, there being a passage from the high-pressure chamber through the piston-valve to the intermediate-pressure chamber, and a passage through the piston-valve from the intermediate-pressure chamber to the low-pressure chamber, whereby the intermediate pressure is maintained at a definite ratio between the high pressure and the low pressure, substantially as described.

5. In a volumetric valve, in combination with a casing having an inlet-passage, and a restricted outlet-passage, a piston-valve, arranged to be subjected at one side to high pressure and to low pressure, and on the other side to an intermediate pressure of mean proportion between the high and the low pressure, whereby the said valve is balanced, and means for automatically disturbing the balance and closing the valve, substantially as described.

6. In combination with a piston arranged to be actuated by water-pressure, and having a passage through the web thereof, a valve arranged to limit the flow of water through said passage, and to yield with increasing resistance as the size of the passage increases, substantially as described.

7. In a flushing device, a high-pressure chamber, a low-pressure chamber, and a pressure-reducing chamber, a piston constituting one of the walls of a pressure-reducing chamber, having inflow from the high-pressure chamber, and an outflow to the low-pressure chamber, said piston being provided with passages, one of which leads from the high-pressure chamber, into the pressure-reducing chamber, and another of which leads from the pressure-reducing chamber into the outlet, a restricting-valve located over the passage which leads into the pressure-reducing chamber, and a capacity-varying device, arranged to engage in the passage which leads out of the pressure-reducing chamber, substantially as described.

8. In a flushing device, a piston-chamber, a flush-valve-actuating piston, interposed between a high-pressure chamber, and a pressure-reducing chamber, and a timing-piston and a stem thereto, the said stem extending through a passage in the flush-valve and being arranged to limit and control the pressure in the pressure-reducing chamber, substantially as described.

9. In a flushing device, the combination of a piston-chamber, a flush-valve, a piston arranged to actuate the flush-valve, and interposed between a high-pressure chamber and a pressure-reducing chamber, a timing-piston located in the pressure-reducing chamber, and provided with a passage through which water may reach both sides of said timing-piston, a stem extending from the timing-piston through an outlet-passage from the pressure-reducing chamber, and arranged to obstruct such passage in varying amount, the amount of obstruction increasing as the timing-piston approaches a position where it finally closes said outlet, substantially as described.

10. In a flushing device, a main valve, and a timing-piston, and means for producing equal pressure on both sides of the timing-piston, during the period of flushing, substantially as described.

11. In a flushing device, a timing-piston and means for distributing a working pressure over the entire areas of both sides of said piston, substantially as described.

In testimony whereof I sign this specification in the presence of two witnesses.

ELON A. MARSH.

Witnesses:
CHARLES F. BURTON,
MARION A. REEVE.